United States Patent
Fujiwara

(10) Patent No.: US 9,566,934 B2
(45) Date of Patent: Feb. 14, 2017

(54) VEHICLE SIDE AIRBAG DEVICE AND MANUFACTURING METHOD OF A SIDE AIRBAG

(71) Applicant: TOYOTA JIDOSHA KABUSHIKI KAISHA, Toyota-shi, Aichi-ken (JP)

(72) Inventor: Yusuke Fujiwara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/820,974

(22) Filed: Aug. 7, 2015

(65) Prior Publication Data
US 2016/0101757 A1     Apr. 14, 2016

(30) Foreign Application Priority Data
Oct. 9, 2014   (JP) .................................. 2014-208043

(51) Int. Cl.
| | | |
|---|---|---|
| *B60R 21/231* | (2011.01) | |
| *B60R 21/2346* | (2011.01) | |
| *B60R 21/2338* | (2011.01) | |
| *B60R 21/233* | (2006.01) | |

(52) U.S. Cl.
CPC ....... *B60R 21/23138* (2013.01); *B60R 21/233* (2013.01); *B60R 21/2346* (2013.01); *B60R 2021/23146* (2013.01); *B60R 2021/23324* (2013.01); *B60R 2021/23382* (2013.01)

(58) Field of Classification Search
CPC .......................................... B60R 2021/23146
See application file for complete search history.

(56) References Cited

U.S. PATENT DOCUMENTS

| | | | | |
|---|---|---|---|---|
| 8,696,021 B2 * | 4/2014 | Yamamoto | ........ | B60R 21/23138 280/730.2 |
| 8,757,657 B1 * | 6/2014 | Hotta | .................... | B60R 21/233 280/730.2 |
| 8,764,056 B2 * | 7/2014 | Wipasuramonton | .... | B60R 21/26 280/729 |
| 8,915,519 B2 * | 12/2014 | Hotta | .................. | B60R 21/2346 280/729 |
| 9,120,457 B2 * | 9/2015 | Kino | .................... | B60R 21/207 |

(Continued)

FOREIGN PATENT DOCUMENTS

| | | |
|---|---|---|
| EP | 2397376 A1 | 12/2011 |
| JP | 2011-126497 A | 6/2011 |

(Continued)

*Primary Examiner* — Ruth Ilan
(74) *Attorney, Agent, or Firm* — Oliff PLC

(57) ABSTRACT

A side airbag device includes: an inflator that is disposed at a side section of a seatback of a vehicle seat and that generates gas on actuation; a side airbag main body that is disposed at the side section and that inflates and deploys at a side of an occupant seated in the vehicle seat due to being supplied with gas from the inflator; and an upper-lower partitioning section that partitions the side airbag main body into an upper inflation section to restrain an upper body of the occupant, and a lower inflation section to restrain a lumbar region of the occupant at a higher internal pressure than the upper inflation section, and that includes a sloped portion sloped toward a seat lower side on progression from a seat front-rear direction center portion toward a seat rear side end portion of the lower inflation section.

5 Claims, 6 Drawing Sheets

(56) References Cited

U.S. PATENT DOCUMENTS

| | | | |
|---|---|---|---|
| 2013/0033022 A1* | 2/2013 | Yamamoto | B60R 21/231 280/730.2 |
| 2014/0210192 A1* | 7/2014 | Hotta | B60R 21/23138 280/730.2 |
| 2015/0021887 A1* | 1/2015 | Hiraiwa | B60R 21/233 280/729 |
| 2015/0239423 A1 | 8/2015 | Hayashi et al. | |
| 2015/0343980 A1* | 12/2015 | Hotta | B60R 21/207 280/728.3 |
| 2015/0367806 A1 | 12/2015 | Fujiwara | |
| 2016/0114757 A1* | 4/2016 | Fujiwara | B60R 21/23138 280/729 |
| 2016/0159313 A1* | 6/2016 | Fujiwara | B60R 21/233 280/729 |

FOREIGN PATENT DOCUMENTS

| | | |
|---|---|---|
| JP | 5141674 B2 | 2/2013 |
| JP | 2014-141159 A | 8/2014 |
| JP | 2014141231 A | 8/2014 |
| WO | 2011132316 A1 | 10/2011 |
| WO | 2013/183130 A1 | 12/2013 |
| WO | 2014/115351 A1 | 7/2014 |

\* cited by examiner

VEHICLE SIDE AIRBAG DEVICE AND MANUFACTURING METHOD OF A SIDE AIRBAG

CROSS-REFERENCE TO RELATED APPLICATION

This application claims priority under 35 USC 119 from Japanese Patent application No. 2014-208043 filed on Oct. 9, 2014, the disclosure of which is incorporated by reference herein.

BACKGROUND OF THE INVENTION

Technical Field

The present invention relates to a vehicle side airbag device and a manufacturing method of a side airbag.

Related Art

Japanese Patent No. 5141674 describes a side airbag that receives a supply of gas from an inflator and inflates and deploys at the side of a vehicle seat. The side airbag includes a tether (partition cloth) that extends in a straight line along the seat front-rear direction and partitions the side airbag up and down. A non-return valve is integrally formed to the tether, and configuration is such that internal pressure becomes higher at a lower section side of the side airbag.

SUMMARY

In the invention of Patent Document above, the lumbar region of an occupant is effectively restrained (protected) by increasing the internal pressure of the side airbag at the lumbar region, where impact resistance properties of the occupant are comparatively high. However, if the tether is set aligned with a male occupant of standard build (AM50), the tether would be positioned at the height of the abdominal region of a female occupant with a small physique (AF05), such that there is a possibility of detriment to the restraint performance in the lumbar region.

In consideration of the above circumstances, an object of the present invention is to obtain a side airbag device and a manufacturing method of a side airbag capable of securing good lumbar region restraint performance with respect to occupants with different builds.

Solution to Problem

A side airbag device according to a first aspect of the present invention includes: an inflator that is disposed at a side section of a seatback of a vehicle seat and that generates gas on actuation; a side airbag main body that is disposed at the side section and that inflates and deploys at a side of an occupant seated in the vehicle seat due to being supplied with gas from the inflator; and an upper-lower partitioning section that partitions the side airbag main body into an upper inflation section to restrain an upper body of the occupant, and a lower inflation section to restrain a lumbar region of the occupant at a higher internal pressure than the upper inflation section, and that includes a sloped portion sloped toward a seat lower side on progression from a seat front-rear direction center portion toward a seat rear side end portion of the lower inflation section.

In the side airbag device according to the first aspect of the present invention, the side airbag main body is disposed at the side section of the seatback of the vehicle seat, and inflates and deploys at the side of the occupant due to being supplied with gas from the inflator. The side airbag main body is partitioned by the upper-lower partitioning section into the upper inflation section to restrain the upper body of the occupant and the lower inflation section to restrain the lumbar region of the occupant. Since the lower inflation section at the lumbar region of the occupant, which has comparatively high impact resistance properties, is set with a higher internal pressure, the lumbar region of the occupant can be effectively restrained (protected).

The upper-lower partitioning section includes the sloped portion sloped toward the seat lower side on progression from the seat front-rear direction center portion toward the seat rear side end portion of the lower inflation section. Thus even in cases in which a female occupant with a small physique (AF05) is seated, the lower inflation section with a high internal pressure can be suppressed from pressing (making direct contact) at the height of the abdominal region of the occupant. Namely, detriment to the restraint performance in the lumbar region of the occupant can be suppressed.

A side airbag device according to a second aspect of the present invention is the first aspect, wherein the upper inflation section is partitioned in the seat front-rear direction by a front-rear partitioning section, such that a seat rear side of the upper inflation section attains a higher internal pressure than a seat front side of the upper inflation section.

Similarly to the first aspect, the side airbag device according to the second aspect of the present invention can suppress detriment to the restraint performance in the lumbar region of a female occupant with a small physique (AF05). Moreover, the upper inflation section is partitioned in the seat front-rear direction by the front-rear partitioning section, such that the seat rear side attains a higher internal pressure. This enables the lumbar region and back, which have comparatively high impact resistance properties, to be effectively restrained (protected).

A side airbag device according to a third aspect of the present invention is the first aspect, wherein the upper-lower partitioning section includes an upper-lower partitioning tether that is stitched to an inner face of the side airbag main body; and the sloped portion is formed by cutting out a seat rear side of the upper-lower partitioning tether.

In the side airbag device according to the third aspect of the present invention, the seat rear side of the upper-lower partitioning tether is cut out, and the cut-out portion configures the sloped portion sloped toward the seat lower side on progression from the seat front-rear direction center portion toward the seat rear side end portion. Note that "cut out" referred to herein is not limited to the upper-lower partitioning tether actually being cut out, and is a broad concept including upper-lower partitioning tethers formed in a shape including a cut-out portion.

A side airbag device according to a fourth aspect of the present invention is the third aspect, wherein a tube-shaped cloth, that extends along a seat up-down direction and configures a diffuser covering an outer periphery of the inflator during inflation and deployment, is stitched to the upper-lower partitioning tether; and a seat lower side end portion of the tube-shaped cloth extends further toward the seat lower side than the upper-lower partitioning tether and configures a non-return valve that restricts outflow of gas from the lower inflation section to the upper inflation section during inflation and deployment of the side airbag main body.

The side airbag device according to the fourth aspect of the present invention enables the diffuser and the non-return valve to be formed using a single tube-shaped cloth.

A side airbag device according to a fifth aspect of the present invention is the second aspect, wherein the front-rear partitioning section is disposed along a torso line that is an axial line of the upper body of the occupant; and the sloped portion is disposed running from a lower end portion of the front-rear partitioning section along a perpendicular line to the torso line.

A sixth aspect of the present invention is a manufacturing method of a side airbag, the side airbag including a side airbag main body that is formed of one or more base cloths and that inflates and deploys at a side of an occupant seated in a vehicle seat, and an upper-lower partitioning tether that partitions the side airbag main body up and down, that includes a sloped portion with an upper edge sloping toward a seat lower side on progression toward a seat rear side at the seat rear side of the side airbag main body, and in which a lowermost portion of the sloped portion is formed positioned further toward a seat upper side than a stitchable lower limit height, the manufacturing method comprising: an upper edge stitching process of stitching the upper edge of the upper-lower partitioning tether to an inner face of the side airbag main body; a lower edge stitching process of folding the side airbag main body with the stitched upper edge in two, so as to be superimposed in a seat width direction, folding back a seat lower side of the side airbag main body further to the seat upper side than the lower limit height, and stitching together lower edges of the upper-lower partitioning tether; and a peripheral edge stitching process of stitching together superimposed peripheral edges of the side airbag main body.

In the manufacturing method of a side airbag according to the sixth aspect of the present invention, the upper edge of the upper-lower partitioning tether is stitched to the inner face of the side airbag main body in the upper edge stitching process. Next, in the lower edge stitching process, the side airbag main body is folded in two so as to be superimposed in the seat width direction, the seat lower side of the side airbag main body is folded back further to the seat upper side than the stitchable lower limit height, and the lower edges of the upper-lower partitioning tether are stitched together. Note that, since the lowermost portion of the sloped portion of the upper-lower partitioning tether is positioned further to the seat upper side than the lower limit height, the side airbag main body can be folded back further to the seat upper side than the lower limit height at least, enabling the lower edges of the partition tether to stitched together well. The side airbag can be manufactured by stitching the peripheral edges of the side airbag main body together in the peripheral edge stitching process after the lower edge stitching process.

Advantageous Effects of Invention

As explained above, the side airbag device according to the first aspect of the present invention has an excellent advantageous effect of enabling good lumbar region restraint performance to be secured for occupants with different builds.

The side airbag device according to the second aspect of the present invention has an excellent advantageous effect of enabling occupant restraint performance to be improved.

The side airbag device according to the third aspect of the present invention has an excellent advantageous effect of enabling the upper-lower partitioning section including the sloped portion to be formed using a simple configuration.

The side airbag device according to the fourth aspect of the present invention has an excellent advantageous effect of enabling the diffuser and the non-return valve to be formed using a simple configuration.

The manufacturing method of a side airbag device according to the sixth aspect of the present invention has an excellent advantageous effect of enabling the side airbag to be easily manufactured without requiring a complex procedure.

BRIEF DESCRIPTION OF THE DRAWINGS

Embodiments of the present invention will be described in detail based on the following figures, wherein:

FIG. 3 is an exploded view illustrating an outstretched state prior to a side airbag main body and an upper-lower partitioning tether according to the first exemplary embodiment being stitched, as viewed face-on;

DETAILED DESCRIPTION OF THE INVENTION

First Exemplary Embodiment

Explanation follows regarding a side airbag device according to a first exemplary embodiment of the present invention, with reference to FIG. 1 to FIG. 4. Note that in each of the drawings as appropriate, the arrow FR, the arrow UP, and the arrow OUT respectively indicate the seat front direction, the seat upper direction, and the seat width direction outside of a vehicle seat installed with the side airbag device according to the present exemplary embodiment. Unless specifically stated otherwise, simple reference to the front-rear, up-down, and left-right directions in the below explanation refers to front-rear in the seat front-rear direction, up-down in the seat up-down direction, and left-right when facing the front in the seat front-rear direction.

Overall Configuration of Side Airbag Device

Figure 1:
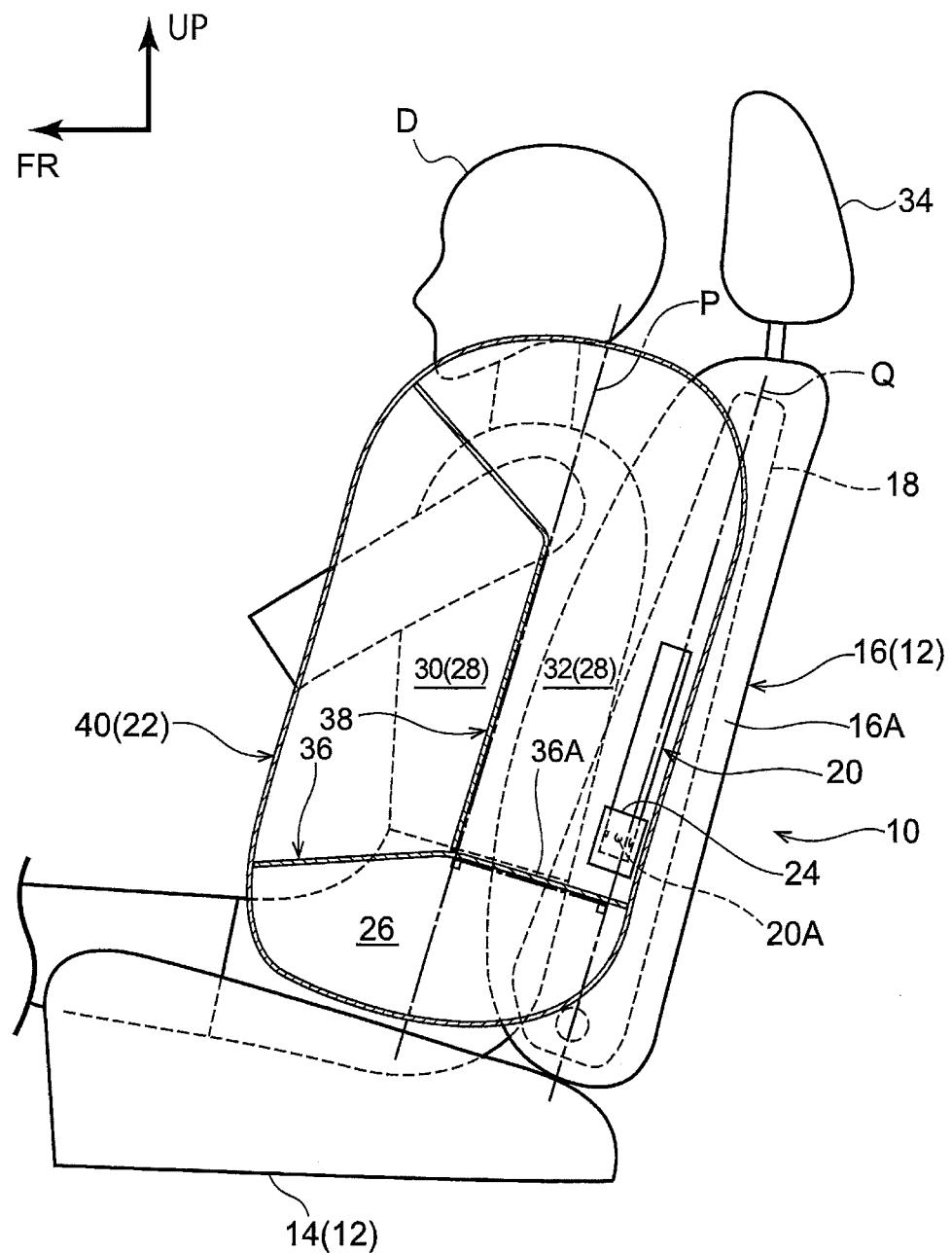
FIG. 1 is a side view illustrating a vehicle seat including a side airbag device according to a first exemplary embodiment, as viewed from a seat width direction outside.

As illustrated in FIG. 1, a side airbag device 10 is mounted to at least of one a side section at the vehicle width direction inside, or a side section at the vehicle width direction outside, of a seatback 16 of a vehicle seat 12. In the present exemplary embodiment as an example, the side airbag device 10 is mounted to a side section 16A, serving as a side section at the vehicle width direction outside of the seatback 16.

The vehicle seat 12 is, for example, a driving seat in a left-hand drive vehicle. The vehicle seat 12 includes a seat cushion 14 on which an occupant sits, and the seatback 16 that supports the back of the occupant. The seatback 16 is reclinably coupled to a rear end portion of the seat cushion 14. A resin seatback board, not illustrated in the drawings, is fixed to a seatback frame 18, serving as a frame section of the seatback 16, at a back face of the seatback 16. The seatback board forms a styling face of the back face of the seatback 16. A headrest 34 is coupled to an upper end portion of the seatback 16.

Note that in the present exemplary embodiment, the front-rear direction, left-right direction (width direction), and up-down direction of the vehicle seat 12 are aligned with the front-rear direction, left-right direction (width direction), and up-down direction of the vehicle applied with the vehicle seat 12. In FIG. 1, a crash test dummy D is illustrated seated in the vehicle seat 12 instead of an actual occupant. The dummy D is, for example, a World Side Impact Dummy (World SID) of an AF05 (an American adult female in the 5$^{th}$ percentile). The dummy D is seated in a standard seated posture specified in collision testing methods, and the vehicle seat 12 is positioned in a set reference position according to the seated posture. In order to facilitate understanding of the explanation, the dummy D is hereafter referred to as "occupant D".

The side airbag device 10 of the present exemplary embodiment is a device that mainly protects the occupant D on the collision side (nearer side) in the event of a side-on collision of the vehicle, and includes an inflator 20 and a side airbag 22 (bag body).

The inflator 20 is what is referred to as a cylinder type inflator, and is installed inside the side airbag 22 in a stance with its length direction along the length direction of the seatback 16 (substantially the up-down direction) in seat side view. Plural gas ejection ports 20A are formed to a lower end portion of the inflator 20, and configuration is such that gas is ejected in a substantially radial shape from the gas ejection ports 20A. On actuation of the inflator 20, gas is ejected from the gas ejection ports 20A, and the gas is supplied to the side airbag 22. A substantially circular tube shaped diffuser 24, for regulating the gas ejected from the gas ejection ports 20A, is crimped to the inflator 20 at the periphery of the lower end portion of the inflator 20.

The inflator 20 is fixed to the seatback frame 18 configuring the seatback 16. Specifically, stud bolts, not illustrated in the drawings, project out from an outer peripheral portion of the inflator 20 toward the seat width direction inside, and the stud bolts pierce through a base cloth of the side airbag 22 and the seatback frame 18. Nuts are then screwed on from leading end sides of the stud bolts, and the side airbag 22 is fastened and fixed to the seatback frame 18 through the inflator 20.

The inflator 20 is electrically connected to an ECU, not illustrated in the drawings, this being a controller. Sensors, not illustrated in the drawings, for detecting a side-on collision of the vehicle applied with the side airbag device 10, are electrically connected to the ECU, enabling the occurrence of a side-on collision (or the inevitability of a side-on collision), and the side (right side or left side) at which the side-on collision occurs, to be detected. The ECU is configured to actuate the inflator 20 when the ECU has detected (the inevitability of) a side-on collision of the vehicle based on signals from the sensors.

Figure 2:
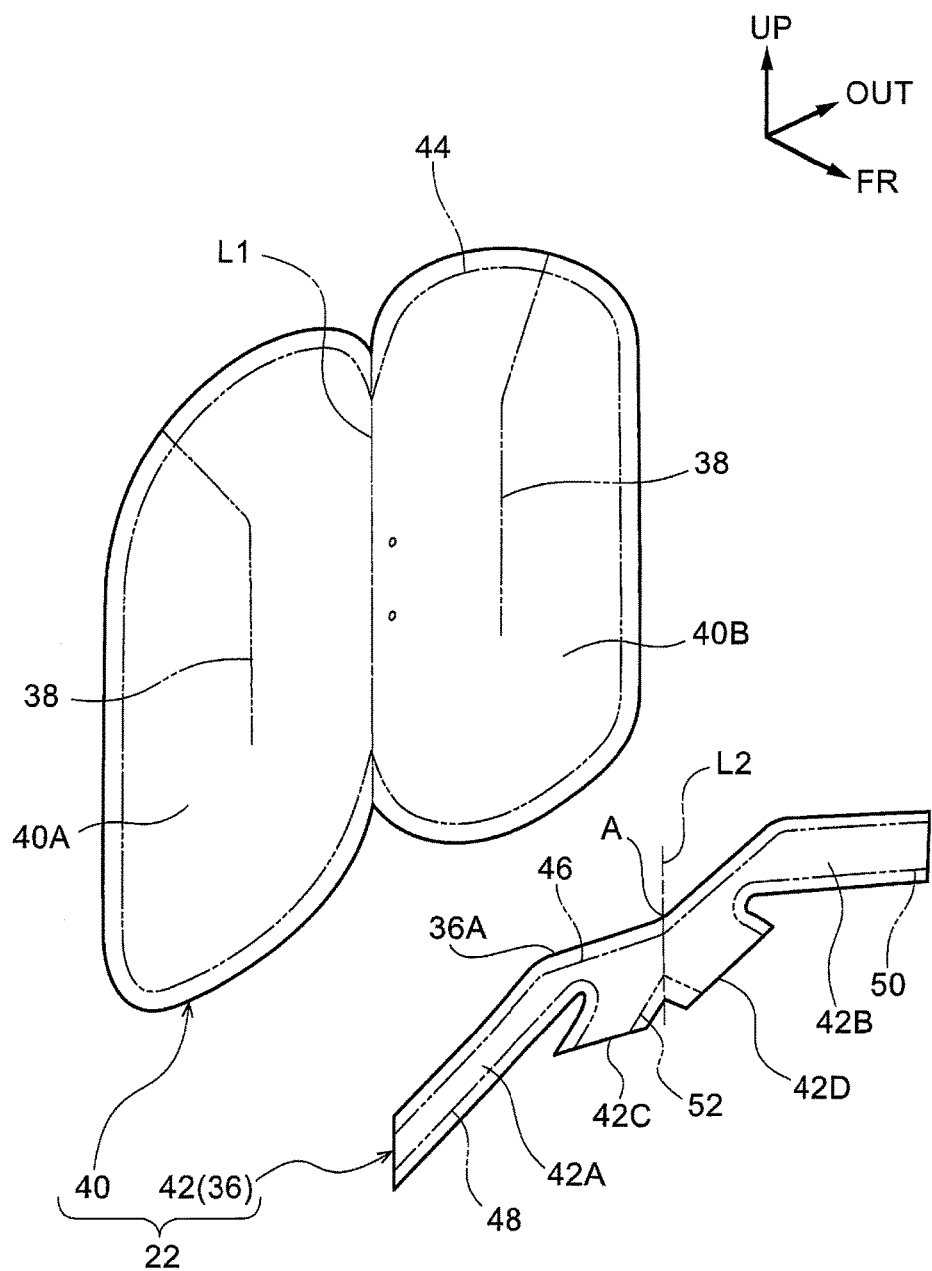
FIG. 2 is an opened-out view illustrating an outstretched state prior to a side airbag main body and an upper-lower partitioning tether according to the first exemplary embodiment being stitched, as viewed obliquely from above.

The side airbag 22 includes a side airbag main body 40 formed in a bag shape by stitching together outer peripheral portions of one, or two or more, base cloths. As illustrated in FIG. 2, the side airbag main body 40 of the present exemplary embodiment is formed by folding a single base cloth in two.

As illustrated in FIG. 1, in an inflated and deployed state, the side airbag 22 is formed in a substantially rectangular shape in seat side view. The side airbag 22 is configured capable of restraining from the lumbar region to the upper body of the occupant D from the vehicle width direction outside.

The side airbag 22 is partitioned in the seat up-down direction by an upper-lower partitioning section 36. Specifically, the side airbag 22 is partitioned into an upper inflation section 28 restraining the upper body of the occupant D at the seat upper side of the upper-lower partitioning section 36, and a lower inflation section 26 restraining the lumbar region of the occupant D at the seat lower side of the upper-lower partitioning section 36. The lower inflation section 26 is configured to attain higher internal pressure than the upper inflation section 28 using a non-return valve 56 (see FIG. 4), described later.

As illustrated in FIG. 2, the upper-lower partitioning section 36 is configured including a belt shaped upper-lower partitioning tether 42, and is stitched to an inner face of the side airbag main body 40. As illustrated in FIG. 1, a front side of the upper-lower partitioning section 36 extends along the seat front-rear direction from a seat front side end portion to a seat front-rear direction center portion of the lower inflation section 26. A rear side of the upper-lower partitioning section 36 includes a sloped portion 36A sloping toward the seat lower side on progression from the seat front-rear direction center portion toward a seat rear side end portion of the lower inflation section 26. Note that the "seat front-rear direction center portion of the lower inflation section 26" referred to herein is not limited to the strict center (middle) of a straight line linking the front end portion and the rear end portion of the lower inflation section 26 along the seat front-rear direction. Namely, the concept also includes a configuration in which a seat front side end portion of the sloped portion 36A is formed in a position offset from the seat front-rear direction center (middle) toward the seat front or the seat rear, as a result of dimensional tolerance or design tolerance. Moreover, the seat front-rear direction may be considered to be an inflation and deployment direction of the side airbag 22 (a direction in a perpendicular line to a seat frame line Q) when setting the position of the sloped portion 36A. In the present exemplary embodiment, the seat front side end portion of the sloped portion 36A is provided at a position of a torso line P (an axial line of the upper body) of the occupant D in seat side view.

A slope angle of the sloped portion 36A is preferably formed the same as a perpendicular line to the torso line P, or so as to slope further toward the seat lower side than the perpendicular line to the torso line P. Moreover, the slope angle of the sloped portion 36A is preferably formed the same as a perpendicular line to the seat frame line Q linking the headrest 34 and a recliner, not illustrated in the drawings, or so as to slope further toward the seat lower side than the perpendicular line to the seat frame line Q. In the present exemplary embodiment, the torso line P and the seat frame line Q are set so as to be substantially parallel each other, with their respective perpendicular lines aligned. The sloped portion 36A is sloped at the angle along the perpendicular lines.

The upper inflation section 28 is partitioned in the seat front-rear direction by a front-rear partitioning section 38. Specifically, the front-rear partitioning section 38 extends along the seat up-down direction along the torso line P of the occupant D in seat side view, from the upper-lower partitioning section 36 to the lower side of the shoulders of the occupant D, then bends toward the seat front side at the lower side of the shoulders of the occupant D and extends diagonally upward. The upper inflation section 28 is partitioned by the front-rear partitioning section 38 into a front inflation section 30 that restrains the side of the chest of the occupant D at the seat front side of the front-rear partitioning section 38, and a rear inflation section 32 that restrains the side of the back of the occupant D at the seat rear side of the front-rear partitioning section 38. The rear inflation section 32 is configured to attain higher internal pressure than the front inflation section 30. Note that, since a front-rear partitioning tether configuring the front-rear partitioning section 38 has a known configuration, illustration and explanation thereof is omitted.

Side Airbag

Detailed explanation follows regarding the side airbag 22 of the present exemplary embodiment.

Figure 3:
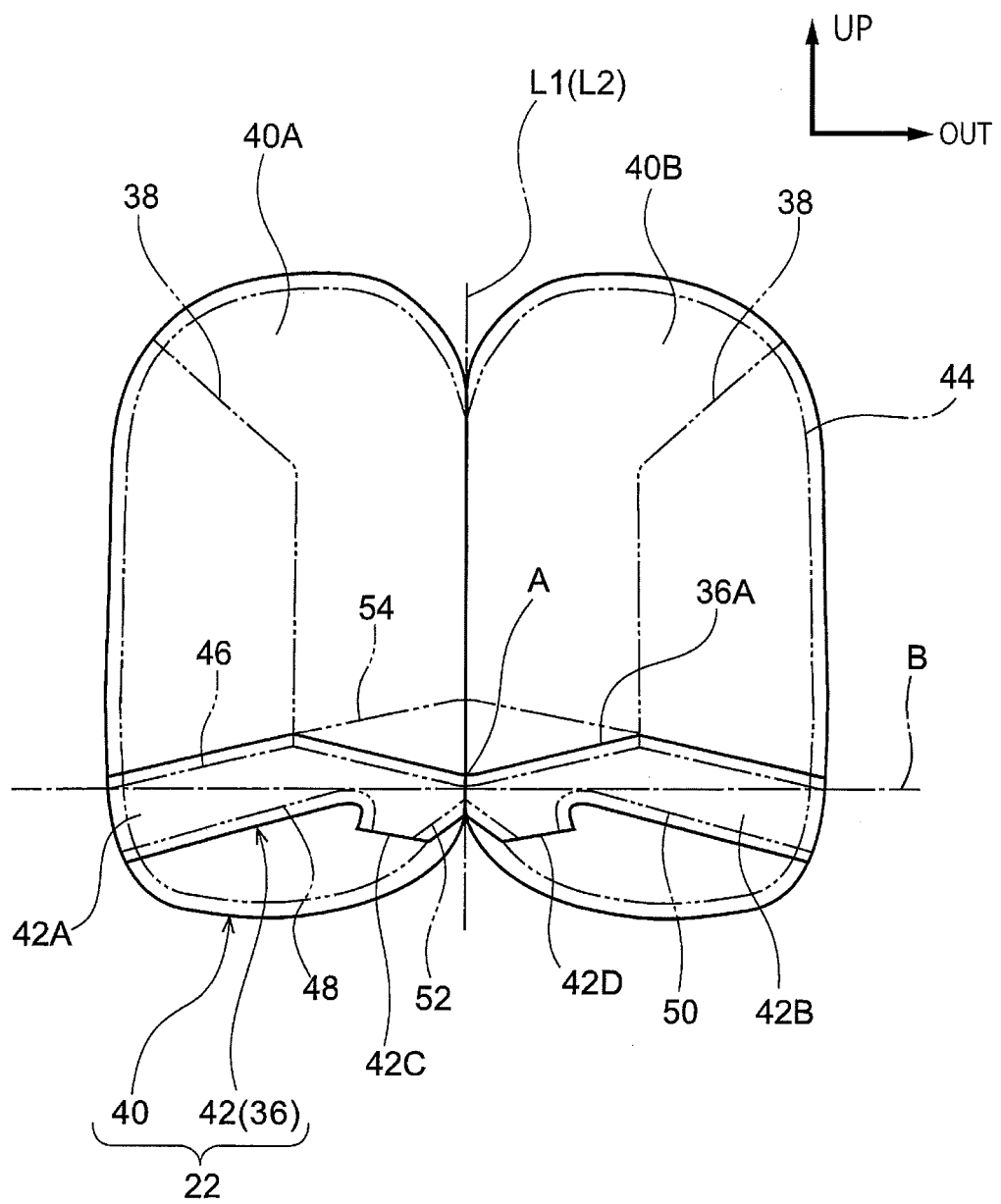

As illustrated in FIG. 2 and FIG. 3, the side airbag main body 40 configuring the side airbag 22 is configured including a single base cloth formed using polyester thread, polyamide thread, or the like. In an outstretched state prior to stitching, the side airbag main body 40 has a shape of substantially rectangular shaped base cloths with their length directions along the seat up-down direction, linked together in the seat width direction. A fold line L1 along the seat up-down direction is set at a seat width direction center portion of the side airbag main body 40. The side airbag main body 40 is folded into two at the fold line L1, and stitched together superimposed in the seat width direction. In the present exemplary embodiment, the position of the fold line L1 forms the position of a seat rear end side of the side airbag main body 40 when inflated and deployed. Note that in the below explanation, an inside main body portion 40A is configured at the seat width direction inside of the fold line L1, and an outside main body portion 40B is configured at the seat width direction outside of the fold line L1, of the side airbag main body 40 in the outstretched state prior to stitching.

The inside main body portion 40A and the outside main body portion 40B are formed with line symmetry about the fold line L1. Peripheral edge stitch portions 44 are set at a peripheral edge of the inside main body portion 40A and a peripheral edge of the outside main body portion 40B. The peripheral edge stitch portions 44 are set to be aligned when the inside main body portion 40A and the outside main body portion 40B are superimposed on each other, and the bag shaped side airbag main body 40 is formed by stitching along the peripheral edge stitch portions 44 in a superimposed state of the inside main body portion 40A and the outside main body portion 40B.

The upper-lower partitioning tether 42 is formed by a belt shaped base cloth with its length along the seat width direction in an outstretched state prior to stitching, and its length along the seat width direction is substantially the same as that of the side airbag main body 40. As illustrated in FIG. 3, an upper end portion at a seat width direction center portion of the upper-lower partitioning tether 42 has a shape from which a substantially rhombus shaped region 54 has been cut out in front view.

As illustrated in FIG. 2, a fold line L2 along the seat up-down direction is set at the seat width direction center portion of the upper-lower partitioning tether 42. Note that in the below explanation, an inside upper-lower partitioning portion 42A is configured at the seat width direction inside of the fold line L2, and an outside upper-lower partitioning portion 42B is configured at the seat width direction outside of the fold line L2, of the upper-lower partitioning tether 42 in the outstretched state prior to stitching.

The inside upper-lower partitioning portion 42A and the outside upper-lower partitioning portion 42B are formed with line symmetry about the fold line L2. A lower edge of the inside upper-lower partitioning portion 42A slopes toward the seat upper side on progression toward the fold line L2 in the outstretched state, and curves (bends) toward the seat lower side in the vicinity of the fold line L2 to form an inside extension portion 42C. A lower edge of the outside upper-lower partitioning portion 42B slopes toward the seat upper side on progression toward the fold line L2 in the outstretched state, and curves (bends) toward the seat lower side in the vicinity of the fold line L2 to form an outside extension portion 42D.

An upper edge of the inside upper-lower partitioning portion 42A slopes toward the seat upper side on progression toward the fold line L2 in the outstretched state, and curves (bends) toward the seat lower side at a seat width direction center portion of the inside upper-lower partitioning portion 42A. The upper edge then slopes toward the seat lower side on progression from the seat width direction center portion toward the fold line L2. Namely, the upper edge of the inside upper-lower partitioning portion 42A is formed in an inverted V-shape.

An upper edge of the outside upper-lower partitioning portion 42B is also formed in an inverted V-shape in the outstretched state, similarly to the inside upper-lower partitioning portion 42A. Namely, the upper edge of the outside upper-lower partitioning portion 42B slopes toward the seat upper side on progression toward the fold line L2, and curves (bends) toward the seat lower side at a seat width direction center portion of the outside upper-lower partitioning portion 42B. The upper edge then slopes toward the seat lower side on progression from the seat width direction center portion toward the fold line L2. The sloped portion 36A is accordingly formed by sloping the upper edges of the inside upper-lower partitioning portion 42A and the outside upper-lower partitioning portion 42B on progression from the seat width direction center portions toward the fold line L2 in this manner.

An upper edge stitch portion 46, contiguous along the seat width direction, is set at the upper edges of the inside upper-lower partitioning portion 42A and the outside upper-lower partitioning portion 42B. An upper edge of the upper-lower partitioning tether 42 is stitched to the side airbag 22 by stitching the upper edge stitch portion 46 in a state in which the upper-lower partitioning tether 42 is superimposed on a specific position of the side airbag main body 40.

An inside lower edge stitch portion 48 is set at the lower edge of the inside upper-lower partitioning portion 42A. An outside lower edge stitch portion 50 is set at the lower edge of the outside upper-lower partitioning portion 42B. The inside lower edge stitch portion 48 extends toward the fold line L2 along the lower edge of the inside upper-lower partitioning portion 42A from an end portion at the opposite side to the fold line L2, and curves (bends) toward the seat lower side along the inside extension portion 42C. The outside lower edge stitch portion 50 extends, from an end portion at the opposite side to the fold line L2, toward the fold line L2 along the lower edge of the outside upper-lower partitioning portion 42B, and curves (bends) toward the seat lower side along the outside extension portion 42D. An inverted, substantially V-shaped center side lower edge stitch portion 52 is set between the fold line L2 side of the inside extension portion 42C and the fold line L2 side of the outside extension portion 42D, so as to be contiguous across the inside upper-lower partitioning portion 42A and the outside upper-lower partitioning portion 42B.

The inside lower edge stitch portion 48 and the outside lower edge stitch portion 50 are stitched together in a state in which the upper-lower partitioning tether 42 is folded into two along the fold line L2. The center side lower edge stitch portion 52 at the inside upper-lower partitioning portion 42A and the center side lower edge stitch portion 52 at the outside upper-lower partitioning portion 42B is also stitched. This enables a space inside the side airbag 22 to be partitioned up and down. The substantially tube shaped non-return valve 56 (see FIG. 4) is formed by superimposing and stitching together the inside extension portion 42C and the outside extension portion 42D.

Note that the front-rear partitioning tether, not illustrated in the drawings, is stitched to the side airbag main body 40 with its length direction along the seat up-down direction, and the front-rear partitioning section 38 is formed by the front-rear partitioning tether.

Manufacturing Method of Side Airbag

Explanation follows regarding a manufacturing method of the side airbag 22 of the present exemplary embodiment. First, the upper edge of the upper-lower partitioning tether 42 is stitched to the specific position of the side airbag main body 40 along the upper edge stitch portion 46 (an upper edge stitching process). As illustrated in FIG. 3, this is performed employing the upper-lower partitioning tether 42 from which the region 54 has been cut out. A lowermost portion A of the sloped portion 36A is pre-positioned at the seat upper side of a stitchable lower limit height B. Note that "lower limit height B" used herein refers to the height of a hypothetical line extending along the seat width direction and passing through an uppermost portion of whichever out of the inside lower edge stitch portion 48 (outside lower edge stitch portion 50) or the center side lower edge stitch portion 52 is furthest toward the seat upper side.

Next, one seat width direction end portion of the front-rear partitioning tether, not illustrated in the drawings, configuring the front-rear partitioning section 38 is stitched to the inside main body portion 40A or the outside main body portion 40B. The side airbag main body 40 and the upper-lower partitioning tether 42 are then folded in two along the fold line L1 and the fold line L2, and superimposed in the seat width direction. The other seat width direction end portion of the front-rear partitioning tether, not illustrated in the drawings, is stitched to form the front-rear partitioning section 38 when this is performed.

Figure 4:
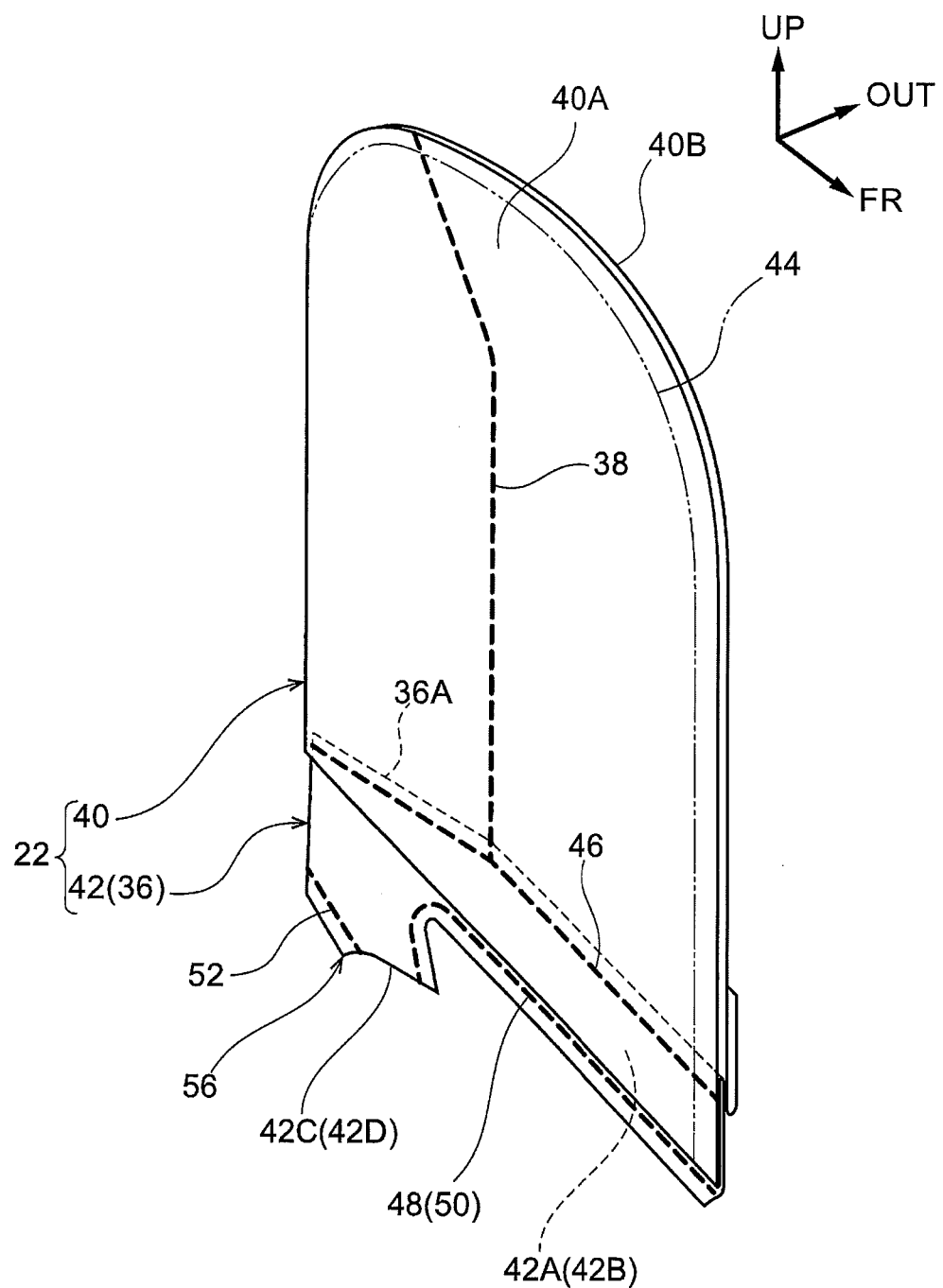
FIG. 4 is a schematic perspective view to explain a lower edge stitching process of a side airbag according to the first exemplary embodiment.

Next, as illustrated in FIG. 4, the seat lower side of the side airbag main body 40, superimposed in the seat width direction, is folded back to expose a lower portion of the upper-lower partitioning tether 42. Note that in FIG. 4, illustration of folded-back portions of the side airbag main body 40 is omitted for ease of explanation.

Note that, when folding back the side airbag main body 40, folding further toward the seat upper side than the stitchable lower limit height B, illustrated in FIG. 3, enables the inside lower edge stitch portion 48 (outside lower edge stitch portion 50) and the center side lower edge stitch portion 52 to be completely exposed. If the side airbag main body 40 was folded back to the seat lower side of the lower limit height B, at least a portion of the inside lower edge stitch portion 48 (outside lower edge stitch portion 50) or the center side lower edge stitch portion 52 would not be exposed, such that it would not always be possible to stitch the lower edges of the upper-lower partitioning tether 42 well.

After folding back the side airbag main body 40 further toward the seat upper side than the lower limit height B, the lower edges of the upper-lower partitioning tether 42 are stitched together (a lower edge stitching process). Specifically, the lower edge of the inside upper-lower partitioning portion 42A and the lower edge of the outside upper-lower partitioning portion 42B are stitched together along the inside lower edge stitch portion 48 and the outside lower edge stitch portion 50. The respective seat rear sides of the inside extension portion 42C and the outside extension portion 42D are also stitched together along the center side lower edge stitch portion 52. Thus the side airbag main body 40 is partitioned up and down, and the non-return valve 56 is formed.

After the lower edges of the upper-lower partitioning tether 42 have been stitched together, the seat lower side of the folded-back side airbag main body 40 is returned to its original state, and the peripheral edges of the side airbag main body 40 are stitched together (a peripheral edge stitching process). Specifically, the peripheral edges of the inside main body portion 40A and the outside main body portion 40B, that are superimposed in the seat width direction, are stitched together along the peripheral edge stitch portions 44. A seat front side end portion of the upper-lower partitioning tether 42 is also stitched together when this is performed. An upper end portion of the front-rear partitioning tether, not illustrated in the drawings, is also stitched together.

The side airbag 22 of the present exemplary embodiment is manufactured in the manner described above.

Operation and Advantageous Effects

Explanation follows regarding operation and advantageous effects of the present exemplary embodiment. Note that in the below explanation, explanation follows regarding operation and advantageous effects of the side airbag device 10 applied to the vehicle seat 12 at the side at which a side-on collision occurs (collision side or nearer side).

In the side airbag device 10 of the present exemplary embodiment, the inflator 20 is actuated when the ECU detects a side-on collision based on signals from the sensors. When this occurs in the vehicle seat 12, gas generated by the inflator 20 is supplied to the side airbag 22 through the diffuser 24.

Note that the side airbag 22 is partitioned into the upper inflation section 28 and the lower inflation section 26 by the upper-lower partitioning section 36. Moreover, since the non-return valve 56 is formed to the upper-lower partitioning section 36, the flow of gas from the lower inflation section 26 into the upper inflation section 28 is restricted, and the internal pressure in the lower inflation section 26 becomes higher. This enables the lumbar region of the occupant D, which has comparatively high impact resistance properties, to be effectively restrained (protected).

The upper inflation section 28 is partitioned in the seat front-rear direction by the front-rear partitioning section 38, and is configured such that the internal pressure becomes higher at the seat rear side. This enables the back side of the upper body of the occupant D, which has comparatively high impact resistance properties, to be restrained (protected). Namely, by partitioning the upper inflation section 28 in the seat front-rear direction using the front-rear partitioning section 38, the lumbar region and back can be effectively restrained (protected), and restraint performance can be improved.

As illustrated in FIG. 1, in the present exemplary embodiment, the sloped portion 36A is provided to the upper-lower partitioning section 36, and the upper-lower partitioning section 36 slopes toward the seat lower side on progression from the seat front-rear direction center portion toward the seat rear side end portion. Thus even when the occupant D is a woman with a small physique (AF05), the lower inflation section 26 with a high internal pressure does not make direct contact with the abdominal region of the occupant D. Namely, detriment to the restraint performance in the lumbar region can be suppressed. In the case of a male occupant with a standard build (AM50), the position of the abdominal region is higher than that of a woman with a small physique (AF05), such that the lower inflation section 26 does not press against the abdominal region. This enables good lumbar region restraint performance to be secured for occupants with different builds.

As illustrated in FIG. 3, in the present exemplary embodiment, the sloped portion 36A is formed by cutting out the region 54 positioned at the seat rear side of the upper-lower partitioning tether 42. This enables the upper-lower partitioning section 36 to be formed including the sloped portion 36A using a simple configuration.

In the present exemplary embodiment as described above, the lowermost portion A of the sloped portion 36A of the upper-lower partitioning tether 42 is formed so as to be positioned further toward the seat upper side than the stitchable lower limit height B. This enables the side airbag main body 40 and the upper-lower partitioning tether 42 to be folded in two, the seat lower side of the side airbag main body 40 to be folded back, and the lower edges of the upper-lower partitioning tether 42 to be stitched together in a desirable manner in the lower edge stitching process, after having stitched the upper edge of the upper-lower partitioning tether 42 in the upper edge stitching process. Namely, even in a structure in which the non-return valve 56 is integrally formed to the upper-lower partitioning tether 42, no complex procedure is required, and the side airbag can be easily manufactured.

In the present exemplary embodiment, an example has been explained in which the side airbag device 10 of the present invention is applied to a driving seat; however the present invention is not limited thereto. The present invention may also be applied, for example, to a front passenger seat. The present invention may also be applied to seats in a second row onward in a type of vehicle in which left and right seats are disposed separated along the vehicle width direction. Side airbag devices 10 may be provided to both seats adjacent in the seat width direction, and may be provided, for example, to both the driving seat and the front passenger seat. The side airbag device 10 may also be provided to only one out of the driving seat or the front passenger seat.

In the present exemplary embodiment, an example has been explained in which the inflator 20 is actuated in the event of a side-on collision of the vehicle; however the present invention is not limited thereto. Configuration may be applied, for example, in which the inflator 20 is actuated during a small overlap collision in which another vehicle collides with a vehicle width direction outer end section of the vehicle itself, or in an oblique collision in which another vehicle collides obliquely from the front with the vehicle itself.

In the present exemplary embodiment, an example has been explained in which the substantially circular tube shaped diffuser 24 is provided inside the side airbag 22; however the present invention is not limited thereto. A configuration may be applied, for example, in which the diffuser 24 is not provided.

In the present exemplary embodiment, internal pressure in the lower inflation section 26 is set higher than in the upper inflation section 28 by forming the non-return valve 56; however the present invention is not limited thereto. For example, a configuration capable of restricting the flow of gas from the lower inflation section 26 into the upper inflation section 28 may be adopted to raise internal pressure in the lower inflation section 26, without providing the non-return valve 56.

In the present exemplary embodiment, the upper inflation section 28 is configured partitioned in the seat front-rear direction using the front-rear partitioning section 38; however the present invention is not limited thereto. A configuration may be applied, for example, in which the front-rear partitioning section 38 is not provided. In such cases, although the side airbag 22 becomes a two chamber configuration of the upper inflation section 28 and the lower inflation section 26, the lumbar region of the occupant D can be effectively restrained (protected) similarly to in the present exemplary embodiment by setting internal pressure in the lower inflation section 26 higher than in the upper inflation section 28.

In the present exemplary embodiment, the inside upper-lower partitioning portion 42A and the outside upper-lower partitioning portion 42B of the upper-lower partitioning tether 42 are formed with line symmetry about the fold line L2; however the present invention is not limited thereto. For example, since it is sufficient that the sloped portion 36A be formed at the side of the side airbag 22 nearest to the occupant D (the inside upper-lower partitioning portion 42A) alone, the location positioned at the seat rear side of the outside upper-lower partitioning portion 42B does not need to be cut out. In such cases, since the sloped portion 36A is formed at the side of the lower inflation section 26 that makes contact with the occupant D, the lower inflation section 26 with a high internal pressure does not press against the abdominal region of the occupant D.

Second Exemplary Embodiment

Figure 5:
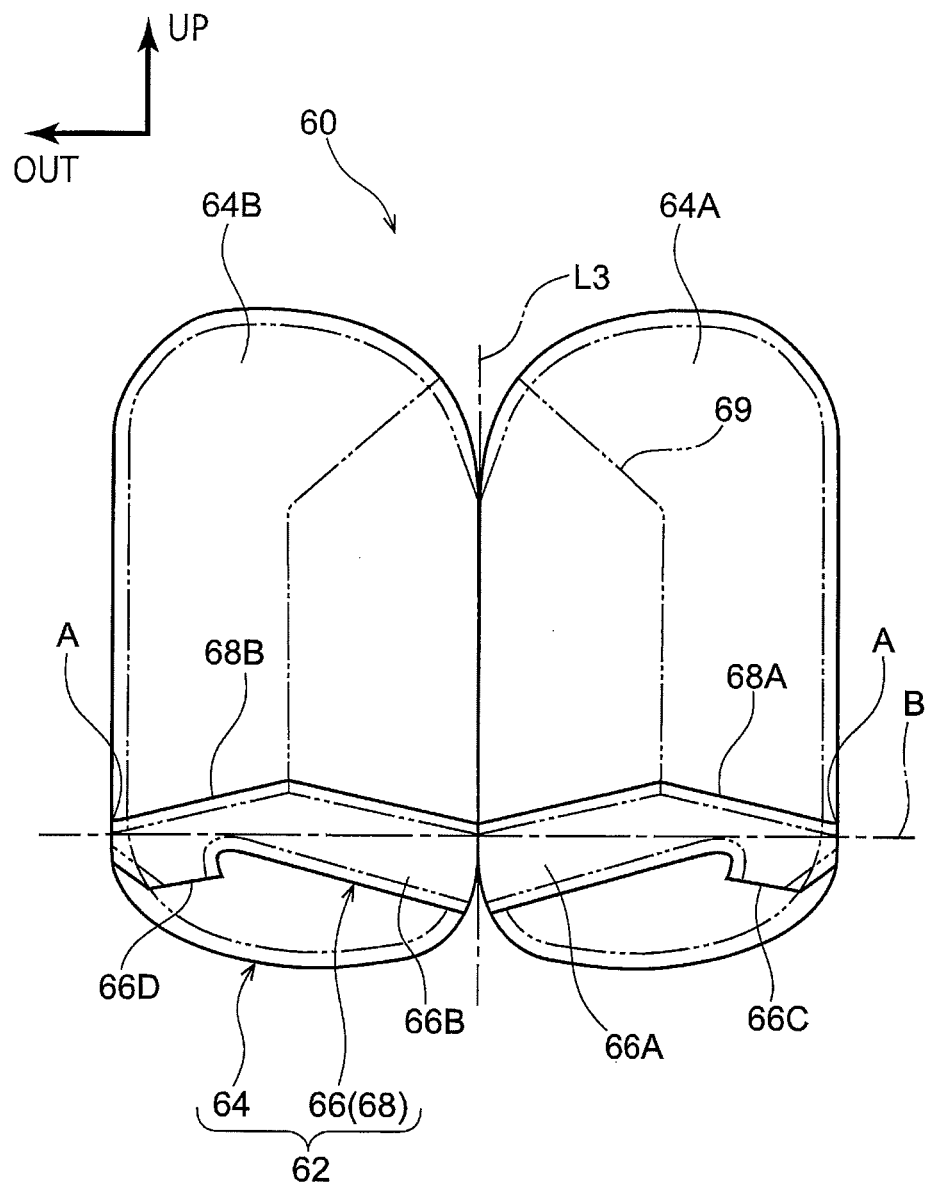
FIG. 5 is an exploded view corresponding to FIG. 3, illustrating a side airbag main body and an upper-lower partitioning tether according to a second exemplary embodiment.

Explanation follows regarding a side airbag device according to a second exemplary embodiment of the present invention, with reference to FIG. 5.

As illustrated in FIG. 5, a side airbag 62 configuring a side airbag device 60 according to the present exemplary embodiment is configured including a side airbag main body 64, an upper-lower partitioning tether 66 configuring an upper-lower partitioning section 68, and a front-rear partitioning tether, not illustrated in the drawings, configuring a front-rear partitioning section 69. An inflator, not illustrated in the drawings, is disposed inside the side airbag 62. Note that the inflator is configured similarly to in the first exemplary embodiment.

A fold line L3 along the seat up-down direction is set at a seat width direction center portion of the side airbag main body 64. The side airbag main body 64 is folded in two at the fold line L3, superimposed in the seat width direction, and stitched together. In the present exemplary embodiment, a positional relationship between an inside main body portion 64A further to the seat width direction inside than the fold line L3, and an outside main body portion 64B further toward the seat width direction outside than the fold line L3, of the side airbag main body 64 in an outstretched state prior to stitching, is the reverse of that in the first exemplary embodiment. Namely, the fold line L3 side is positioned at the seat front side after stitching. Moreover, the side at which respective peripheral edges of the inside main body portion 64A and the outside main body portion 64B are stitched together when folded in two at the fold line L3 is positioned at the seat rear side.

The positional relationship of the upper-lower partitioning tether 66 is also inverted, corresponding to the side airbag main body 64. An inside sloped portion 68A, serving as a sloped portion, is accordingly formed at an end portion at the opposite side of an inside upper-lower partitioning portion 66A, positioned at the seat width direction inside of the upper-lower partitioning tether 66, to the fold line L3. An outside sloped portion 68B, serving as a sloped portion, is formed at an end portion at the opposite side of an outside upper-lower partitioning portion 66B, positioned at the seat width direction outside of the upper-lower partitioning tether 66, to the fold line L3. The inside sloped portion 68A and the outside sloped portion 68B are formed to slope toward the seat lower side on progression from seat front-rear direction center portions toward seat rear side end portions when the side airbag 62 is inflated and deployed.

Lowermost portions A of the inside sloped portion 68A and the outside sloped portion 68B configure positions at a peripheral edge of the side airbag main body 64. An inside extension portion 66C extends toward the seat lower side at the end portion of the inside upper-lower partitioning portion 66A at the opposite side to the fold line L3, and an outside extension portion 66D extends toward the seat lower side at the end portion of the outside upper-lower partitioning portion 66B at the opposite side to the fold line L3.

Operation and Advantageous Effects

Explanation follows regarding operation and advantageous effects of the second exemplary embodiment.

In the side airbag device 60 of the present exemplary embodiment, although the position of the fold line L3 and the positions of peripheral edge stitch portions when the side airbag 62 is inflated and deployed have an inverted positional relationship in the seat front-rear direction to that in the first exemplary embodiment, operation and advantageous effects are similar to those in the first exemplary embodiment. Namely, due to providing the upper-lower partitioning section 68 with the inside sloped portion 68A and the outside sloped portion 68B, the upper-lower partitioning section 68 slopes toward the seat lower side on progression from the seat front-rear direction center portions toward the seat rear side end portions. Thus even in cases of a female occupant with a small physique (AF05), a lower inflation section with a high internal pressure, further to the seat lower side than the upper-lower partitioning section 68, does not press against the abdominal region of the occupant. Namely, detriment to the restraint performance in the lumbar region can be suppressed. Other operation and advantageous effects are similar to those in the first exemplary embodiment.

Third Exemplary Embodiment

Figure 6:
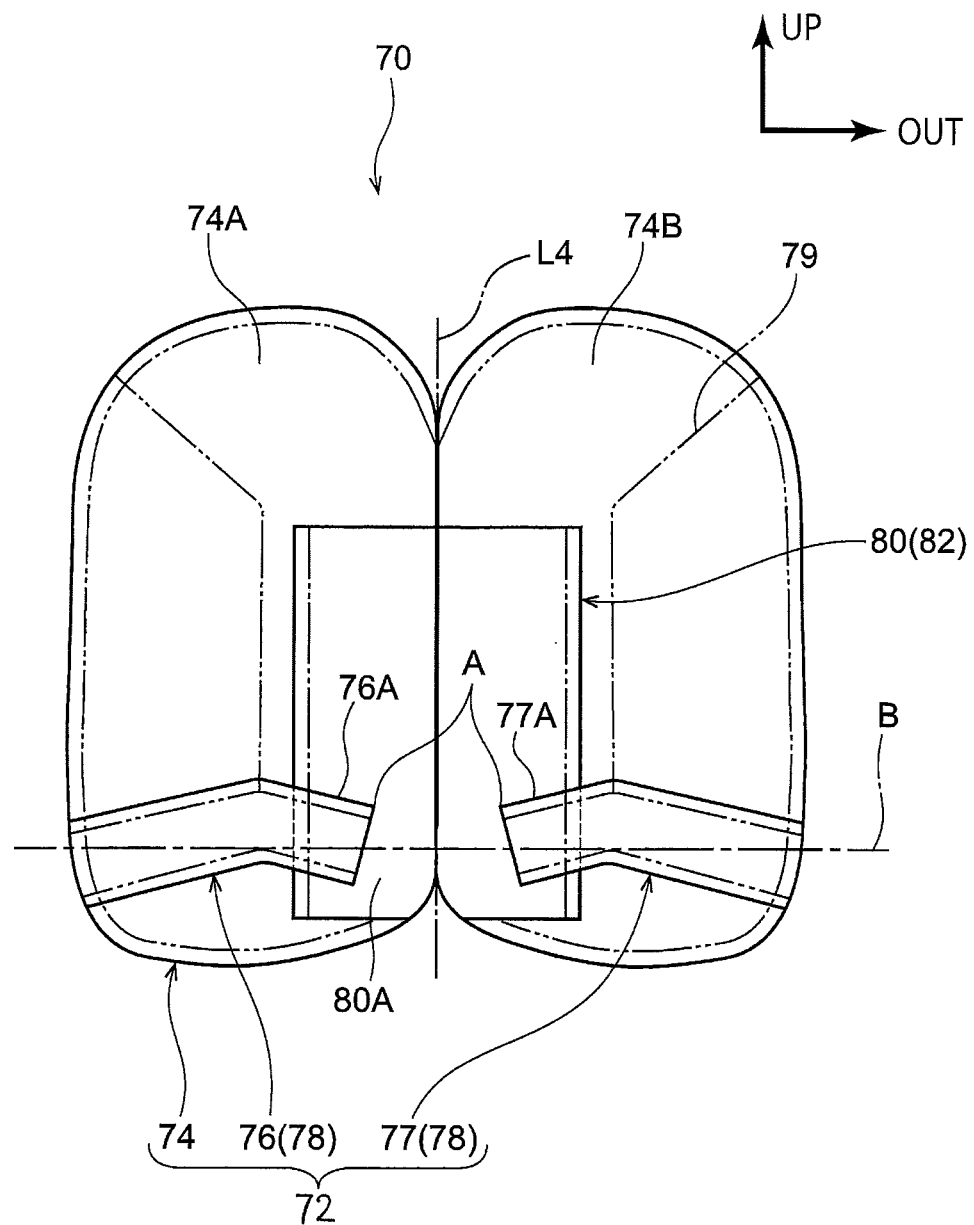
FIG. 6 is an exploded view corresponding to FIG. 3, illustrating a side airbag main body and upper-lower partitioning tethers according to a third exemplary embodiment.

Explanation follows regarding a side airbag device according to a third exemplary embodiment, with reference to FIG. 6.

As illustrated in FIG. 6, a side airbag 72 configuring a side airbag device 70 of the present exemplary embodiment is configured including a side airbag main body 74, an upper-lower partitioning tether 76 and an upper-lower partitioning tether 77 configuring an upper-lower partitioning section 78, a front-rear partitioning tether, not illustrated in the drawings, configuring a front-rear partitioning section 79, and a tube-shaped cloth 80 configuring a diffuser 82. An inflator, not illustrated in the drawings, is disposed inside the side airbag 72. Note that the inflator is configured similarly to in the first exemplary embodiment. The tube-shaped cloth 80 is configured so as to cover an outer periphery of the inflator, and configures a diffuser 82 for regulating the flow of gas ejected from the inflator.

A fold line L4 along the seat up-down direction is set at a seat width direction center portion of the side airbag main body 74. The side airbag main body 74 is folded in two along the fold line L4, superimposed in the seat width direction, and stitched together.

An inside main body portion 74A further to the seat width direction inside, and an outside main body portion 74B further to the seat width direction outside, than the fold line L4 of the side airbag main body 74 in an outstretched state prior to stitching, are configured in shapes with line symmetry about the fold line L4.

The upper-lower partitioning tether 76 and the upper-lower partitioning tether 77 are disposed with an interval along the seat width direction therebetween in the outstretched state prior to stitching. Note that the upper-lower partitioning tether 76 is disposed further toward the seat width direction inside than the fold line L4, and slopes toward the seat upper side on progression from a peripheral edge of the inside main body portion 74A toward the fold line L4. An inside sloped portion 76A is formed bending toward the seat lower side at a seat width direction center portion of the inside main body portion 74A. The inside sloped portion 76A does not reach as far as the fold line L4, and a lowermost portion A of the inside sloped portion 76A is positioned further toward the seat upper side than the stitchable lower limit height B.

The upper-lower partitioning tether 77 is disposed further toward the seat width direction outside than the fold line L4, and slopes toward the seat upper side on progression from a peripheral edge of the outside main body portion 74B toward the fold line L4. An outside sloped portion 77A is formed bending toward the seat lower side at a seat width direction center portion of the outside main body portion 74B. The outside sloped portion 77A does not reach as far as the fold line L4, and a lowermost portion A of the outside sloped portion 77A is positioned further toward the seat upper side than the stitchable lower limit height B. Thus the upper-lower partitioning section 78 is configured of two tethers. The upper-lower partitioning tether 76 and the upper-lower partitioning tether 77 are not provided with the inside extension portion 42C or the outside extension portion 42D of the first exemplary embodiment.

The tube-shaped cloth 80 is formed in a substantially rectangular shape in an outstretched state prior to stitching, and is disposed at a seat width direction center portion of the side airbag main body 74. The upper-lower partitioning tether 76 and the upper-lower partitioning tether 77 are superimposed over the tube-shaped cloth 80, and a seat lower side end portion of the tube-shaped cloth 80 configures a non-return valve 80A extending further toward the seat lower side than the upper-lower partitioning tether 76 and the upper-lower partitioning tether 77.

A portion of the tube-shaped cloth 80 further toward the seat upper side than the upper-lower partitioning tether 76 and the upper-lower partitioning tether 77 configures the diffuser 82 that covers the outer periphery of the inflator after stitching, and regulates the flow of gas from the inflator. The non-return valve 80A configures a non-return valve that restricts the flow of gas from a lower inflation section into an upper inflation section after stitching.

A manufacturing method of the side airbag 72 of the present exemplary embodiment is similar to that of the first exemplary embodiment, with the exception of stitching the tube-shaped cloth 80. Namely, first, a seat width direction center portion of the tube-shaped cloth 80 is joined to the side airbag main body 74 by stitching or another means. Then, upper edges of the upper-lower partitioning tether 76 and the upper-lower partitioning tether 77 are stitched to the side airbag main body 74 (an upper edge stitching process), and one end side of the front-rear partitioning tether, not illustrated in the drawings, is stitched to the side airbag main body 74. The side airbag main body 74 is then folded in two along the fold line L4, both seat width direction end portions of the tube-shaped cloth 80 are stitched together, and the other end portion of the front-rear partitioning tether is also stitched on. The side airbag main body 74 is also folded back further toward the upper side than the lower limit height B, and a lower edge of the upper-lower partitioning tether 76 and a lower edge of the upper-lower partitioning tether 77 are stitched together (a lower edge stitching process). Finally, the peripheral edge of the inside main body portion 74A and the peripheral edge of the outside main body portion 74B of the side airbag main body 74 are stitched together (a peripheral edge stitching process).

Operation and Advantageous Effects

Explanation follows regarding operation and advantageous effects of the third exemplary embodiment.

The side airbag device 70 of the present exemplary embodiment enables the diffuser 82 and the non-return valve to be formed using the single tube-shaped cloth 80 alone. Thus there is no need to integrally form a non-return valve to the upper-lower partitioning tether 76 and the upper-lower partitioning tether 77. This also enables the diffuser 82 and the non-return valve to be formed using a simple configuration. Other operation and advantageous effects are similar to those in the first exemplary embodiment.

In the present exemplary embodiment, the upper-lower partitioning section 78 is formed of two tethers, these being the upper-lower partitioning tether 76 and the upper-lower partitioning tether 77; however the present invention is not limited thereto. For example, the upper-lower partitioning tether 76 and the upper-lower partitioning tether 77 may employ a single tether linked at the position of the fold line L4. In such cases, operation and advantageous effects are similar to those in the present exemplary embodiment, as long as a communication hole in communication with the non-return valve is formed to the upper-lower partitioning section 78. The upper-lower partitioning tether 76 and the upper-lower partitioning tether 77 do not need to be formed in the same shape, and may be formed in different shapes.

Side airbag devices according to the first exemplary embodiment to the third exemplary embodiment of the present invention have been explained above. However, it goes without saying that these exemplary embodiments may be combined as appropriate, and various embodiments may be implemented within a range not departing from the spirit of the present invention.

What is claimed is:

1. A side airbag device comprising:
   an inflator that is disposed at a side section of a seatback of a vehicle seat and that generates gas on actuation;
   a side airbag main body that is disposed at the side section and that is adapted to inflate and deploy at a side of an occupant seated in the vehicle seat due to being supplied with gas from the inflator; and
   an upper-lower partitioning section that partitions the side airbag main body into an upper inflation section that is adapted to restrain an upper body of the occupant, and a lower inflation section that is adapted to restrain a lumbar region of the occupant at a higher internal pressure than the upper inflation section, and that includes a sloped portion sloped toward a seat lower side on progression from a seat front-rear direction center portion toward a seat rear side end portion of the lower inflation section,
   wherein a seat front side end portion of the sloped portion is adapted to be provided at a position of a torso line that is an axial line of the upper body of the occupant in a seat side view.

2. The side airbag device of claim 1, wherein
   the upper inflation section is partitioned in the seat front-rear direction by a front-rear partitioning section, such that a seat rear side of the upper inflation section attains a higher internal pressure than a seat front side of the upper inflation section.

3. The side airbag device of claim 1, wherein:
   the upper-lower partitioning section includes an upper-lower partitioning tether that is stitched to an inner face of the side airbag main body; and
   the sloped portion is formed by cutting out a seat rear side of the upper-lower partitioning tether.

4. The side airbag device of claim 3, wherein:
   a tube-shaped cloth, that extends along a seat up-down direction and configures a diffuser covering an outer periphery of the inflator during inflation and deployment, is stitched to the upper-lower partitioning tether; and
   a seat lower side end portion of the tube-shaped cloth extends further toward the seat lower side than the upper-lower partitioning tether and configures a non-return valve that restricts outflow of gas from the lower inflation section to the upper inflation section during inflation and deployment of the side airbag main body.

5. The side airbag device of claim 2, wherein:
   the front-rear partitioning section is adapted to be disposed along the torso line that is the axial line of the upper body of the occupant; and
   the sloped portion is disposed running from a lower end portion of the front-rear partitioning section along a perpendicular line to the torso line, or so as to slope further toward the seat lower side than the perpendicular line to the torso line.

* * * * *